(12) United States Patent
Fornage

(10) Patent No.: US 8,222,767 B2
(45) Date of Patent: Jul. 17, 2012

(54) APPARATUS FOR PHASE ROTATION FOR A THREE-PHASE AC CIRCUIT

(75) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 12/928,685

(22) Filed: Dec. 16, 2010

(65) Prior Publication Data

US 2011/0089766 A1 Apr. 21, 2011

Related U.S. Application Data

(63) Continuation of application No. 12/075,342, filed on Mar. 11, 2008, now Pat. No. 7,855,473.

(51) Int. Cl.
*H02J 1/00* (2006.01)
(52) U.S. Cl. .......................................................... 307/82
(58) Field of Classification Search ..................... 307/14, 307/82
See application file for complete search history.

(56) References Cited

U.S. PATENT DOCUMENTS

| | | | |
|---|---|---|---|
| 5,886,890 | A | 3/1999 | Ishida et al. |
| 6,737,762 | B2 * | 5/2004 | Koenig ............................ 307/48 |
| 7,646,109 | B2 | 1/2010 | Belady et al. |
| 2009/0000654 | A1 | 1/2009 | Rotzoll et al. |

OTHER PUBLICATIONS

Weidong Xiao and William G. Dunford, "Topology Study of Photovoltaic Interface for Maximum Power Point Tracking," *IEEE Transactions on Industrial Electronics*, vol. 54, No. 3, Jun. 2007, pp. 1696-1704.
"Inverters, Converters, Controllers and Interconnection System Equipment for Use With Distributed Energy Resources," *Underwriters Laboratories Inc.*, UL Standard 1741.1, May 7, 1999, downloaded from web site http://ulstandardsinfonet.ul.com/scopes/1741.html on Jun. 11, 2008.
"IEEE Standard for Interconnecting Distributed Resources with Electric Power Systems," IEEE Standard 1547™-2003, *IEEE*, Jul. 28, 2003.
Non-Final Office Action dated Mar. 15, 2010 for U.S. Appl. No. 12/075,342 entitled "Apparatus for Phase Rotation for a Three-Phase AC Circuit", 6 pages.
Final Office Action dated Jul. 19, 2010 for U.S. Appl. No. 12/075,342 entitled "Apparatus for Phase Rotation for a Three-Phase AC Circuit", 9 pages.

* cited by examiner

*Primary Examiner* — Michael Rutland Wallis
(74) *Attorney, Agent, or Firm* — Moser Taboada

(57) ABSTRACT

An apparatus for power conversion. In one embodiment, the apparatus comprises a plurality of AC power sources, wherein each AC power source in the plurality of AC power sources has a phase rotation circuit coupled to a DC/AC inverter for converting DC input power to AC output power, wherein (i) a first phase rotation circuit has first three phase output terminals coupled to second three phase input terminals of a second phase rotation circuit; (ii) the second phase rotation circuit has second three phase output terminals coupled to third three phase input terminals of a third phase rotation circuit; and (iii) the third phase rotation circuit has third three phase output terminals coupled to either fourth three phase input terminals of a fourth phase rotation circuit or to a commercial power grid.

10 Claims, 3 Drawing Sheets

US 8,222,767 B2

APPARATUS FOR PHASE ROTATION FOR A THREE-PHASE AC CIRCUIT

CROSS-REFERENCE TO RELATED APPLICATIONS

The present invention is a continuation of U.S. patent application Ser. No. 12/075,342, filed Mar. 11, 2008 now U.S. Pat. No. 7,855,473, which is herein incorporated in its entirety by reference.

BACKGROUND OF THE INVENTION

1. Field of the Invention

Embodiments of the present disclosure generally relate to an apparatus for providing phase rotation for a three-phase AC circuit.

2. Description of the Related Art

Solar panels have historically been deployed in mostly remote applications, such as remote cabins in the wilderness or satellites, where commercial power was not available. Due to the high cost of installation, solar panels were not an economical choice for generating power unless no other power options were available. However, the worldwide growth of energy demand is leading to a durable increase in energy cost. In addition, it is now well established that the fossil energy reserves currently being used to generate electricity are rapidly being depleted. These growing impediments to conventional commercial power generation make solar panels a more attractive option to pursue.

Solar panels, or photovoltaic (PV) modules, convert energy from sunlight received into direct current (DC). The PV modules cannot store the electrical energy they produce, so the energy must either be dispersed to an energy storage system, such as a battery or pumped hydroelectricity storage, or dispersed by a load. One option to use the energy produced is to employ inverters to convert the DC current into an alternating current (AC) and couple the AC current to the commercial power grid. In this type of system, the power produced by the solar panels can be sold to the commercial power company.

Traditionally, solar systems have used centralized inverters, where many PV modules feed into a single large inverter for the conversion of DC current to AC current in applications such as the one described above. A recent trend has been to decentralize this DC/AC conversion by using micro-inverters. Rather than employing a single large inverter, a micro-inverter is individually coupled to each PV module. Micro-inverters improve the performance of the DC/AC power conversion by optimally extracting the maximum power from each PV module. Micro-inverters also offer the added benefit of using a connective wire bus that carries entirely AC voltage rather than the high voltage DC used in traditional centralized inverter systems, thereby offering improved safety and efficiency.

Micro-inverters are typically arranged in a string on a branch circuit from a load center. Additionally, there may be multiple branch circuits from the load center, where each branch circuit supports a string of micro-inverters and their associated PV modules. In large scale installations, it is common to use three-phase grid connections from the load center. It is not always economical though to have a true three-phase micro-inverter as it requires a substantially more electronics than a single-phase micro-inverter. Traditional methods of connecting single-phase micro-inverters in a three-phase grid connection requires three strings of micro-inverters, where each string is connected to two of the three power phases. In order to properly balance the load on each phase, an electrician needs to install the same number of micro-inverters on each branch circuit and needs to use equally all phases for all of the branch circuits. This leads to a need for extensive installation planning and longer and more cumbersome installations.

Therefore, there is a need in the art for an apparatus that can employ single-phase micro-inverters in three-phase grid connections in such a way that micro-inverter installation and load balancing on the three phases are greatly simplified.

SUMMARY OF THE INVENTION

Embodiments of the present invention generally relate to an apparatus for power conversion. In one embodiment, the apparatus comprises a plurality of AC power sources, wherein each AC power source in the plurality of AC power sources has a phase rotation circuit coupled to a DC/AC inverter for converting DC input power to AC output power, wherein (i) a first phase rotation circuit has first three phase output terminals coupled to second three phase input terminals of a second phase rotation circuit; (ii) the second phase rotation circuit has second three phase output terminals coupled to third three phase input terminals of a third phase rotation circuit; and (iii) the third phase rotation circuit has third three phase output terminals coupled to either fourth three phase input terminals of a fourth phase rotation circuit or to a commercial power grid.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
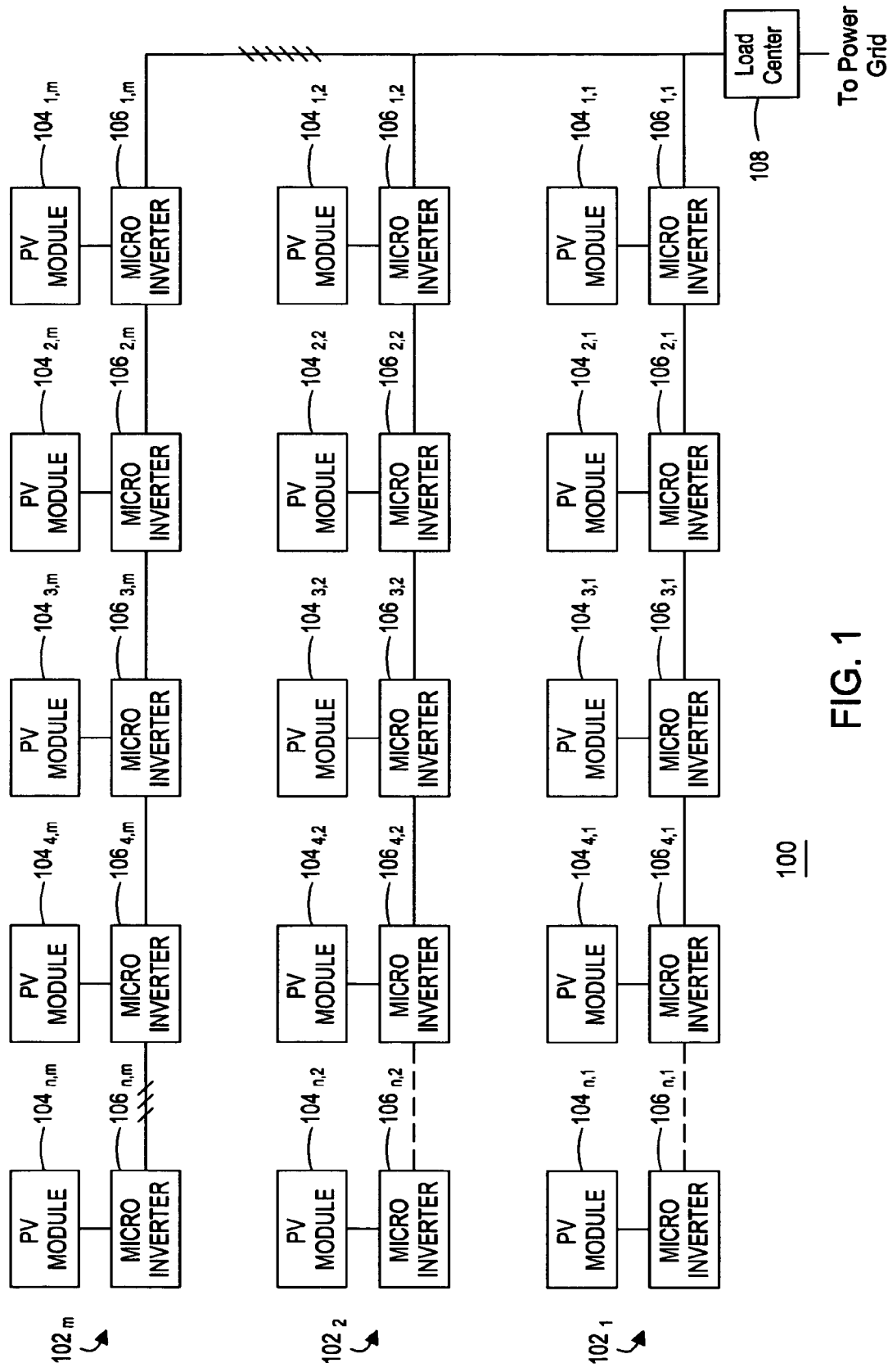
FIG. 1 is a block diagram of an exemplary system for power generation in accordance with one embodiment of the present invention.

FIG. 1 is a block diagram of an exemplary system 100 for power generation in accordance with one embodiment of the present invention. This diagram only portrays one variation of the myriad of possible system configurations. The present invention can function in a variety of power generation environments and systems.

The power generation system 100 comprises a plurality of branch circuits $102_1$, $102_2$ ... $102_m$, from a load center 108. The load center 108 houses connections between incoming power lines from a commercial power grid distribution system and the plurality of branch circuits $102_1$, $102_2$ ... $102_m$, collectively referred to as branch circuits 102. A branch circuit $102_m$ comprises a plurality of micro-inverters $106_{1,m}$, $106_{2,m}$ ... $106_{n,m}$, collectively referred to as micro-inverters 106, coupled in series. Each micro-inverter $106_{1,m}$, $106_{2,m}$ ... $106_{n,m}$ is coupled to a PV module $104_{1,m}$, $104_{2,m}$ ... $104_{n,m}$, collectively referred to as PV modules 104.

The micro-inverters 106 convert DC power generated by the PV modules 104 into AC power. The micro-inverters 106 meter out current that is in-phase with the AC commercial power grid voltage and generate such current with low distortion. The system 100 couples the generated AC power to the commercial power grid via the load center 108.

Figure 2:
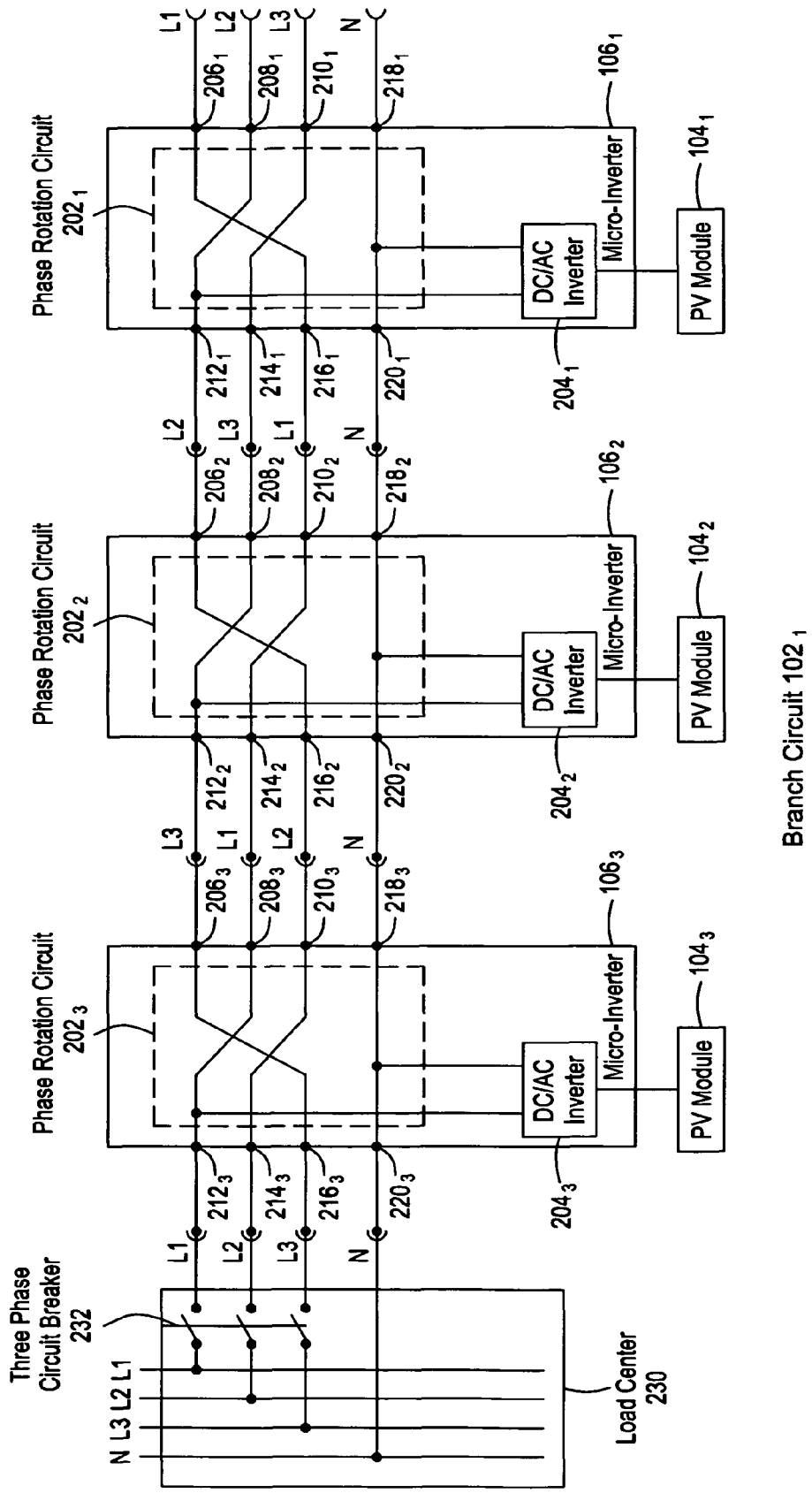
FIG. 2 is a block diagram of an exemplary string of micro-inverters coupled in series on a three-phase branch circuit in accordance with one embodiment of the present invention.

FIG. 2 is a block diagram of an exemplary string of micro-inverters 106 coupled in series on a three-phase branch circuit $102_1$ in accordance with one embodiment of the present invention. A load center 230 comprises four lines $L_1$, $L_2$, $L_3$, and N from, for example, a 277/480V commercial power grid supplying a commercial three-phase AC current (herein known as "commercial AC current"). The line $L_1$ carries a first phase of the commercial AC current (herein known as "first phase of current"), the line $L_2$ carries a second phase of the commercial AC current (herein known as "second phase of current"), and the line $L_3$ carries a third phase of the commercial AC current (herein known as "third phase of current"). The line N is a neutral line that carries a resulting current from the sum of the first, the second, and the third phases of current on the lines $L_1$, $L_2$, and $L_3$. Ideally, the first, the second, and the third phases of current on the lines $L_1$, $L_2$, and $L_3$ are equally balanced such that the magnitude of each is the same and the phases are offset from one another by 120 degrees. When the first, the second, and the third phases of current on the lines $L_1$, $L_2$, and $L_3$ are equally balanced in this manner, the resulting current on the line N is zero.

A three-phase circuit breaker 232 is coupled to the load center 230 to create a 4-line branch circuit $102_1$. The branch circuit $102_1$ comprises the lines $L_1$, $L_2$, $L_3$, and N, a micro-inverter $106_1$, a micro-inverter $106_2$, and a micro-inverter $106_3$, where the micro-inverters $106_1$, $106_2$, and $106_3$ are coupled in a series configuration to the lines $L_1$, $L_2$, $L_3$, and N.

The micro-inverter $106_1$ comprises a phase rotation circuit $202_1$, a single-phase DC/AC inverter $204_1$, input terminals $206_1$, $208_1$, $210_1$, a neutral input terminal $218_1$, output terminals $212_1$, $214_1$, $216_1$, and a neutral output terminal $220_1$. The micro-inverter $106_2$ and the micro-inverter $106_3$ are identical to the micro-inverter $106_1$. Coupling the micro-inverters $106_1$, $106_2$, and $106_3$ in the series configuration is as simple as coupling the output terminals 212, 214, 216, and the neutral output terminal 220 of one micro-inverter 106 to the input terminals 206, 208, 210, and the neutral input terminal 218 respectively of a next micro-inverter 106 in the series. At the load center 230, the lines $L_1$, $L_2$, and $L_3$ are coupled via the three-phase circuit breaker 232 to the output terminals $212_3$, $214_3$, and $216_3$ respectively of the micro-inverter $106_3$; the line N is coupled to the neutral output terminal $220_3$ of the micro-inverter $106_3$. At the micro-inverter $106_1$, the input terminals $206_1$, $208_1$, $210_1$, and the neutral input terminal $218_1$ remain uncoupled. Additionally, the micro-inverters $106_1$, $106_2$, and $106_3$ are each coupled to a PV module $104_1$, $104_2$, and $104_3$, respectively.

At the micro-inverter $106_1$, the output terminals $212_1$, $214_1$, $216_1$, and the neutral output terminal $220_1$ are coupled to the lines $L_2$, $L_3$, $L_1$, and N respectively via the micro-inverters $106_2$ and $106_3$. The DC/AC inverter $204_1$ injects a single phase of AC current through the output terminal 212, onto the line $L_2$. The DC/AC inverter $204_1$ matches the phase of the injected AC current to the second phase of current that is present on the line $L_2$.

Downstream of the output of the micro-inverter $106_1$, the lines $L_2$, $L_3$, $L_1$, and N are coupled to the input terminals $206_2$, $208_2$, $210_2$, and the neutral input terminal $218_2$ respectively of the micro-inverter $106_2$. The phase rotation circuit $202_2$ couples the input terminals $206_2$, $208_2$, $210_2$, and the neutral input terminal $218_2$ to the output terminals $216_2$, $212_2$, $214_2$, and the neutral output terminal $220_2$ respectively; the lines $L_3$, $L_1$, $L_2$, and N are therefore coupled to the output terminals $212_2$, $214_2$, $216_2$, and the neutral output terminal $220_2$ respectively. The DC/AC inverter $204_2$ injects a single phase of AC current through the output terminal $212_2$ onto the line $L_3$. The DC/AC inverter $204_2$ matches the phase of the injected AC current to the third phase of current that is present on the line $L_3$.

Downstream of the output of the micro-inverter $106_2$, the lines $L_3$, $L_1$, $L_2$, and N are coupled to the input terminals $206_3$, $208_3$, $210_3$, and the neutral input terminal $218_3$, respectively, of the micro-inverter $106_3$. The phase rotation circuit $202_3$ couples the input terminals $206_3$, $208_3$, $210_3$, and the neutral input terminal $218_3$ to the output terminals $216_3$, $212_3$, $214_3$, and the neutral output terminal $220_3$ respectively; the lines $L_1$, $L_2$, $L_3$, and N are therefore coupled to the output terminals $212_3$, $214_3$, $216_3$, and the neutral output terminal $220_3$ respectively. The DC/AC inverter $204_3$ injects a single phase of AC current through the output terminal $212_3$ onto the line $L_1$. The DC/AC inverter $204_3$ matches the phase of the injected AC current to the first phase of current that is present on the line $L_1$.

As described above, each of the phase rotation circuits 202 rotates the first, the second, and the third phases of current between the micro-inverters 106 such that a different phase of AC current, phase-matched to one of the three phases of the commercial AC current, is generated by each of the micro-inverters 106. Assuming that the PV modules 104 are receiving equivalent levels of solar energy and that the subsequent AC currents produced by the DC/AC inverters 204 are equivalent in magnitude, the branch circuit $102_1$ generates an equally balanced three-phase AC current that is phase-matched to the commercial AC current. Therefore, the commercial AC current remains equally balanced when the generated three-phase AC current is injected onto the commercial power grid. In addition, a branch circuit 102 comprising a string of micro-inverters 106 coupled in series, where the total number of micro-inverters 106 in the string is a multiple of three, produces the same result in that the three-phase AC current generated by the branch circuit 102 is equally balanced. This automatic balancing of the three-phase AC current generated by the branch circuit 102 improves the efficiency of the system 100 and greatly simplifies installations.

Figure 3:
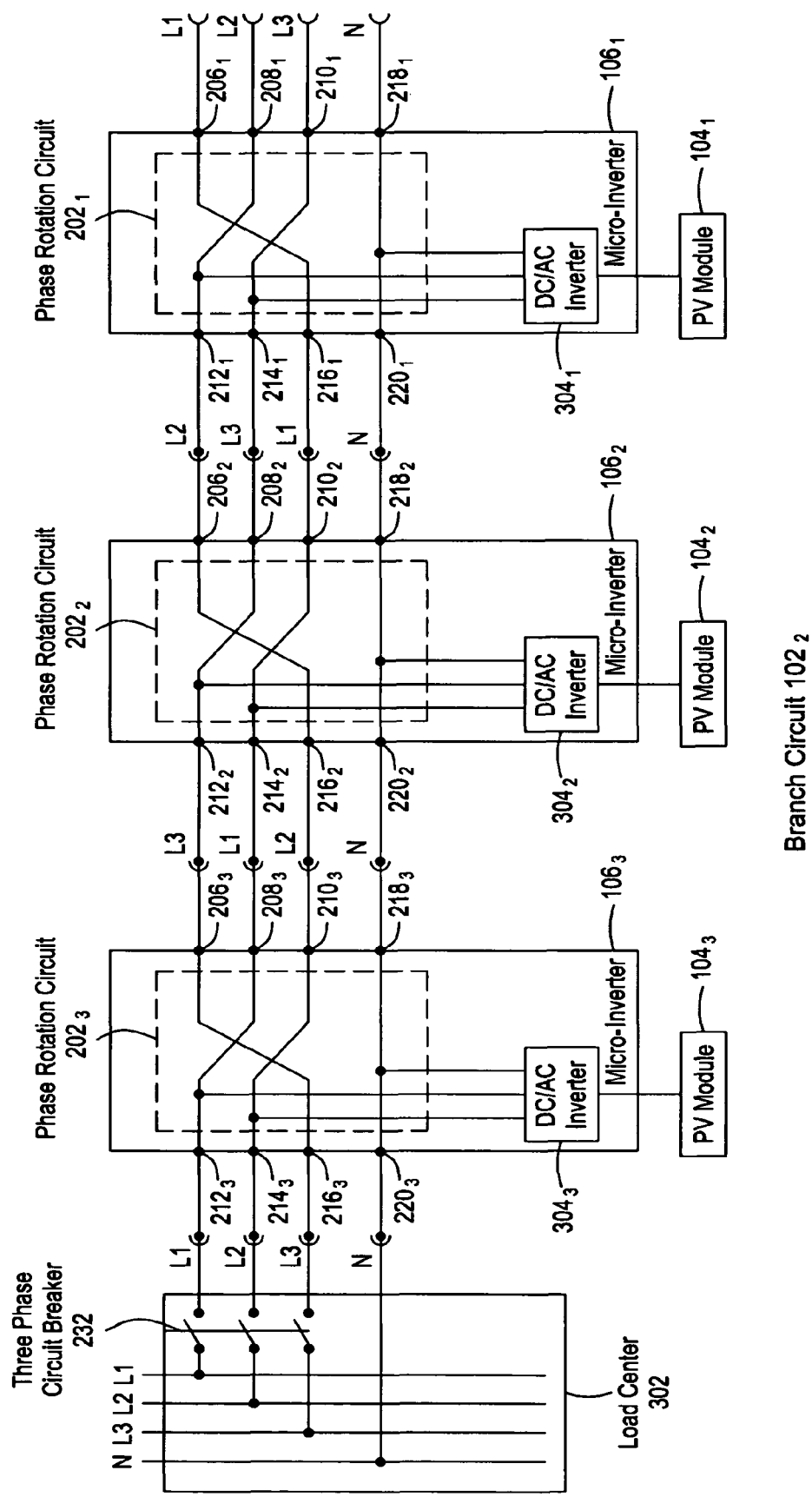
FIG. 3 is a block diagram of an exemplary string of micro-inverters coupled in series on a three-phase branch circuit in accordance with one embodiment of the present invention.

FIG. 3 is a block diagram of an exemplary string of micro-inverters 106 coupled in series on a three-phase branch circuit $102_2$ in accordance with another embodiment of the present invention. A load center 302 comprises four lines $L_1$, $L_2$, $L_3$, and N from, for example, a 120/208V commercial power grid supplying a commercial three-phase AC current (herein known as "commercial AC current"). The line $L_1$ carries a first phase of the commercial AC current (herein known as "first phase of current"), the line $L_2$ carries a second phase of the commercial AC current (herein known as "second phase of current"), and the line $L_3$ carries a third phase of the commercial AC current (herein known as "third phase of current"). The line N is a neutral line that carries a resulting current from the sum of the first, the second, and the third phases of current on the lines $L_1$, $L_2$, and $L_3$. Ideally, the first, the second, and the third phases of current on the lines $L_1$, $L_2$, and $L_3$ are equally balanced such that the magnitude of each is the same and the phases are offset from one another by 120 degrees. When the first, the second, and the third phases of current on the lines $L_1$, $L_2$, and $L_3$ are equally balanced in this manner, the resulting current on the line N is zero.

A three-phase circuit breaker 232 is coupled to the load center 302 to create a 4-line branch circuit $102_2$. The branch circuit $102_2$ comprises the lines $L_1$, $L_2$, $L_3$, and N, a micro-inverter $106_1$, a micro-inverter $106_2$, and a micro-inverter $106_3$, where the micro-inverters $106_1$, $106_2$, and $106_3$ are coupled in a series configuration to the lines $L_1$, $L_2$, $L_3$, and N.

The micro-inverter $106_1$ comprises a phase rotation circuit $202_1$, a two-phase DC/AC inverter $304_1$, input terminals $206_1$, $208_1$, $210_1$, a neutral input terminal $218_1$, output terminals $212_1$, $214_1$, $216_1$, and a neutral output terminal $220_1$. The micro-inverter $106_2$ and the micro-inverter $106_3$ are identical to the micro-inverter $106_1$. Coupling the micro-inverters $106_1$, $106_2$, and $106_3$ in the series configuration is as simple as coupling the output terminals 212, 214, 216, and the neutral output terminal 220 of one micro-inverter 106 to the input terminals 206, 208, 210, and the neutral input terminal 218 respectively of a next micro-inverter 106 in the series. At the load center 302, the lines $L_1$, $L_2$, and $L_3$ are coupled via the three-phase circuit breaker 232 to the output terminals $212_3$, $214_3$, and $216_3$ respectively of the micro-inverter $106_3$; the line N is coupled to the neutral output terminal $220_3$. At the micro-inverter $106_1$, the input terminals $206_1$, $208_1$, $210_1$, and the neutral input terminal $218_1$ remain uncoupled. Additionally, the micro-inverters $106_1$, $106_2$, and $106_3$ are each coupled to a PV module $104_1$, $104_2$, and $104_3$, respectively.

At the micro-inverter $106_1$, the output terminals $212_1$, $214_1$, $216_1$, and the neutral output terminal $220_1$ are coupled to the lines $L_2$, $L_3$, $L_1$, and N respectively via the micro-inverters $106_2$ and $106_3$. The DC/AC inverter $304_1$ injects an AC current through each of the output terminals $212_1$ and $214_1$ onto the lines $L_2$ and $L_3$ respectively. The DC/AC inverter $304_1$ matches the phases of the injected AC currents to the second and the third phases of current that are present on the lines $L_2$ and $L_3$.

Downstream of the output of the micro-inverter $106_1$, the lines $L_2$, $L_3$, $L_1$, and N are coupled to the input terminals $206_2$, $208_2$, $210_2$, and the neutral input terminal $218_2$ respectively of the micro-inverter $106_2$. The phase rotation circuit $202_2$ couples the input terminals $206_2$, $208_2$, $210_2$, and the neutral input terminal $218_2$ to the output terminals $216_2$, $212_2$, $214_2$, and the neutral output terminal $220_2$ respectively; the lines $L_3$, $L_1$, $L_2$, and N are therefore coupled to the output terminals $212_2$, $214_2$, $216_2$, and the neutral output terminal $220_2$ respectively. The DC/AC inverter $304_2$ injects an AC current through each of the output terminals $212_2$ and $214_2$ onto the lines $L_3$ and $L_1$ respectively. The DC/AC inverter $304_2$ matches the phases of the injected AC currents to the third and the first phases of current that are present on the lines $L_3$ and $L_1$.

Downstream of the output of the micro-inverter $106_2$, the lines $L_3$, $L_1$, $L_2$, and N are coupled to the input terminals $206_3$, $208_3$, $210_3$, and the neutral input terminal $218_3$ respectively of the micro-inverter $106_3$. The phase rotation circuit $202_3$ couples the input terminals $206_3$, $208_3$, $210_3$, and the neutral input terminal $218_3$ to the output terminals $216_3$, $212_3$, $214_3$, and the neutral output terminal $220_3$ respectively; the lines $L_1$, $L_2$, $L_3$, and N are therefore coupled to the output terminals $212_3$, $214_3$, $216_3$, and the neutral output terminal $220_3$ respectively. The DC/AC inverter $304_3$ injects an AC current through each of the output terminals $212_3$ and $214_3$ onto the lines $L_1$ and L2 respectively. The DC/AC inverter $304_2$ matches the phases of the injected AC currents to the third and the first phases of current that are present on the lines $L_1$ and $L_2$.

As described above, the phase rotation circuits 202 rotate the first, the second, and the third phases of current between the micro-inverters 106 such that a different set of phases of AC current, where each of the phases is phase-matched to one of the three phases of the commercial AC current, is generated by each of the micro-inverters 106. Assuming that the PV modules 104 are receiving equivalent levels of solar energy and that the subsequent AC currents produced by the DC/AC inverters 304 are equivalent in magnitude, the branch circuit $102_2$ generates an equally balanced three-phase AC current that is phase-matched to the commercial AC current. Therefore, the commercial AC current remains equally balanced when the generated three-phase AC current is injected onto the commercial power grid. In addition, a branch circuit 102 comprising a string of micro-inverters 106 coupled in series, where the total number of micro-inverters 106 in the string is a multiple of three, produces the same result in that the three-phase AC current generated by the branch circuit 102 is equally balanced. This automatic balancing of the three-phase AC current generated by the branch circuit 102 improves the efficiency of the system 100 and greatly simplifies installations.

While the foregoing is directed to embodiments of the present invention, other and further embodiments of the invention may be devised without departing from the basic scope thereof, and the scope thereof is determined by the claims that follow.

The invention claimed is:

1. An apparatus for power conversion comprising:
a plurality of power conversion modules, wherein each power conversion module in the plurality of power conversion modules has a phase rotation circuit coupled to a DC/AC inverter for converting DC input power to AC output power, wherein (i) a first phase rotation circuit has first three phase output terminals coupled to second three phase input terminals of a second phase rotation circuit; (ii) the second phase rotation circuit has second three phase output terminals coupled to third three phase input terminals of a third phase rotation circuit; and (iii) the third phase rotation circuit has third three phase output terminals coupled to either fourth three phase input terminals of a fourth phase rotation circuit or to a commercial power grid, and wherein each power conversion module of the plurality of power conversion modules is adapted to be coupled proximate a different photovoltaic (PV) module of a plurality of PV modules.

2. The apparatus of claim 1, wherein, for each power conversion module in the plurality of power conversion modules, the DC/AC inverter is coupled to at least one of a first, a second, or a third conductor of the phase rotation circuit, wherein the first, the second, and the third conductors couple three phase input terminals of the phase rotation circuit to three phase output terminals of the phase rotation circuit.

3. The apparatus of claim 1 further comprising the plurality of PV modules, wherein each PV module in the plurality of PV modules is coupled to a different DC/AC inverter of the plurality of power conversion modules for providing the DC input power.

4. The apparatus of claim 1 wherein a total number of power conversion modules in the plurality of power conversion modules is a multiple of three.

5. The apparatus of claim 1 wherein the third phase rotation circuit is coupled to the commercial power grid via a three-phase circuit breaker.

6. The apparatus of claim 1, wherein the third phase rotation circuit outputs a substantially balanced three-phase AC power.

7. The apparatus of claim 1, wherein the DC/AC inverter generates a single phase of AC power.

8. The apparatus of claim 1, wherein the DC/AC inverter generates two phases of AC power.

9. The apparatus of claim 1, wherein each power conversion module is a micro-inverter.

10. The apparatus of claim 1, further comprising the plurality of PV modules, wherein each DC/AC inverter in the plurality of power conversion modules is coupled to two or more PV modules of the plurality of PV modules.

* * * * *